United States Patent
Stef et al.

(10) Patent No.: US 10,864,890 B2
(45) Date of Patent: Dec. 15, 2020

(54) ELECTRONIC KEY AND METHOD FOR OPERATING AN ELECTRONIC KEY

(71) Applicant: Continental Automotive GmbH, Hannover (DE)

(72) Inventors: Adrian Viorel Stef, Hannover (DE); Gerard Andrica, Hannover (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/549,723

(22) Filed: Aug. 23, 2019

(65) Prior Publication Data

US 2020/0062219 A1 Feb. 27, 2020

(30) Foreign Application Priority Data

Aug. 27, 2018 (EP) .................................... 18465565

(51) Int. Cl.

| | |
|---|---|
| *B60R 25/30* | (2013.01) |
| *E05B 19/00* | (2006.01) |
| *E05B 77/44* | (2014.01) |
| *G01P 13/00* | (2006.01) |
| *E05B 81/78* | (2014.01) |

(52) U.S. Cl.
CPC .............. *B60R 25/30* (2013.01); *E05B 19/00* (2013.01); *E05B 77/44* (2013.01); *E05B 81/78* (2013.01);
(Continued)

(58) Field of Classification Search
CPC ......... B60R 25/30; B60R 25/24; E05B 19/00; E05B 77/44; E05B 81/78; G01P 13/00;
(Continued)

(56) References Cited

U.S. PATENT DOCUMENTS 7,735,025 B2 * 6/2010 Lee ......................... G06F 3/011
345/156
8,997,564 B2 * 4/2015 Nasiri ................ G01C 19/5776
73/493

(Continued)

FOREIGN PATENT DOCUMENTS

CN 204055716 U 12/2014
DE 202010010892 U1 1/2012
(Continued)

OTHER PUBLICATIONS

Aurelien Francillon et al. "Relay Attacks on Passive Keyless Entry and Start Systems in Modern Cars"; Department of Computer Science, ETH Zurich, Switzerland; 2010; https://eprint.iacr.org/2010/332.pdf.

*Primary Examiner* — Nam V Nguyen

(57) ABSTRACT

Upon a triggering event, an electronic key for a vehicle, comprising a microcontroller and a motion sensor to detect movement of a transponder unit, performs a first measurement resulting in a first measurement value, and compares the first measurement value to a predefined threshold value. Subsequently, the key: performs a plurality of first reference measurements to determine a first average value over the plurality of first reference measurements if the first measurement value is below the predefined threshold value; and performs a plurality of second reference measurements to determines a second average value over the plurality of second reference measurements, and compares the second average value with the first average value if the first measurement value equals or is above the predefined threshold value. The electronic key is considered as moving if a difference between the second average value and the first average value is greater than a third threshold.

12 Claims, 2 Drawing Sheets

(52) U.S. Cl.
CPC ......... *G01P 13/00* (2013.01); *E05Y 2400/852* (2013.01); *E05Y 2900/50* (2013.01)

(58) Field of Classification Search
CPC .......... E05Y 2900/50; E05Y 2400/852; G07C 2009/00769; G07C 9/00309
USPC ................ 340/3.1, 5.7, 5.64; 455/352, 41.2; 348/14.01
See application file for complete search history.

(56) References Cited

U.S. PATENT DOCUMENTS

| | | | |
|---|---|---|---|
| 9,008,995 B2* | 4/2015 | Lee | G01P 1/127 |
| | | | 702/141 |
| 9,086,879 B2* | 7/2015 | Gautama | B60R 25/406 |
| 9,141,206 B2* | 9/2015 | Hong | G06F 3/038 |
| 9,292,102 B2* | 3/2016 | Nasiri | G06F 1/1626 |
| 9,304,143 B2* | 4/2016 | Takahashi | G01P 13/00 |
| 9,802,574 B2* | 10/2017 | Jakobsson | B60R 25/31 |
| 9,885,734 B2* | 2/2018 | Liou | G01D 3/10 |
| 9,933,450 B2* | 4/2018 | Levy | G01C 22/006 |
| 10,315,623 B2* | 6/2019 | Iwashita | B60R 25/246 |
| 2013/0176069 A1* | 7/2013 | Leong | B60R 25/24 |
| | | | 327/517 |
| 2014/0368313 A1 | 12/2014 | Seiberts | |
| 2017/0200335 A1* | 7/2017 | Da Deppo | G07C 9/28 |

FOREIGN PATENT DOCUMENTS

| | | |
|---|---|---|
| EP | 1722296 A1 | 11/2006 |
| JP | 2014095223 A | 5/2014 |

* cited by examiner

ELECTRONIC KEY AND METHOD FOR OPERATING AN ELECTRONIC KEY

BRIEF DESCRIPTION OF THE DRAWINGS

Examples are explained with reference to the drawings. In the drawings the same reference characters denote like features.

DETAILED DESCRIPTION

Figure 1:
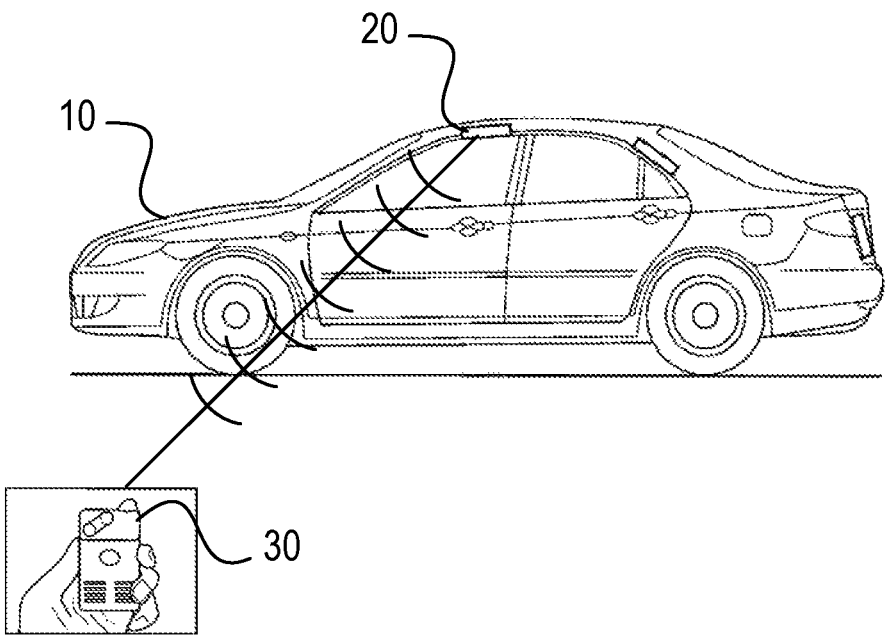
FIG. 1 illustrates an exemplary general principle of an exemplary electronic vehicle key.

The current disclosure relates to an electronic key and a related method for operating an electronic key, and more particularly to an electronic key for a vehicle.

Most vehicles today may be unlocked and started using an electronic key. In some start and access systems the user must press an unlocking button on the electronic key to unlock the vehicle. To start the vehicle, the key must usually be inserted into an arrangement which replaces the ignition switch, as is known from older vehicles. Other start and access systems are known in which the vehicle may be unlocked and started without the user having to press a button or having to insert the key in any arrangement. Such start and access systems are often called keyless start and entry systems. With keyless start and entry systems, the vehicle may be unlocked automatically when the key is detected within a predetermined distance from the vehicle. To start the vehicle, a start button within the vehicle must usually be pressed.

Other start and entry systems are known. However, many of these systems exhibit certain security risks. Some of the risks, for example, are so-called relay attacks. In a relay attack, an unauthorized person places a first device in proximity of the vehicle and a second device in proximity to the related vehicle key. Messages that are sent between the vehicle and the vehicle key may be relayed over long distances that are significantly longer than the usual range of the signals. This allows the unauthorized person to unlock and even start the vehicle, even if the electronic key itself is not in proximity of the vehicle.

Some electronic keys, therefore, comprise motion sensors. If the electronic key receives a signal from the vehicle, it is detected whether the electronic key is presently in motion or not. If no motion of the electronic key is detected when a signal is received from the vehicle, this is seen as an indication that the owner of the vehicle is presently not moving towards the vehicle. Therefore, access to the vehicle may be denied if no motion of the electronic key is detected. For such systems, it is important that motion of the electronic key can be reliably detected.

A need to provide an improved electronic key and method which allow to reliably detect a motion of the electronic key may be addressed by an electronic key and a method as described.

A electronic key for a vehicle includes a motion sensor configured to detect a movement of the transponder unit, and a microcontroller. The electronic key is configured to, upon occurrence of a triggering event, perform a first measurement with the motion sensor resulting in a first measurement value, and compare the first measurement value with a predefined threshold value. If the first measurement value is below the predefined threshold value, the electronic key is configured to perform a plurality of first reference measurements, resulting in a plurality of first measurement values, determine a first average value over the plurality of first reference measurements, and store the first average value in a memory of the microcontroller. If the first measurement value equals or is above the predefined threshold value, the electronic key is configured to perform a plurality of second reference measurements, resulting in a plurality of second measurement values, determine a second average value over the plurality of second reference measurements, and compare the second average value with the first average value, wherein the electronic key is considered as moving if a difference between the second average value and the first average value is greater than a third threshold.

In this way, whether the vehicle key is in motion or not may be reliably detected. In particular, longer movements of the electronic key may be distinguished from short vibrations and impacts more reliably.

The electronic key may be further configured to, after determining the first average value, compare the first average value with a second average value, if a second average value has already been stored in the memory of the microcontroller, wherein the electronic key is considered as not moving if a difference between the first average value and the second average value is greater than a second threshold. This allows a verification of the initial measurement also for the non-moving condition.

The electronic key may be further configured to, after determining the second average value, storing the second average value in the memory of the microcontroller. The second average value is then available for a later comparison with a first average value.

The electronic key may comprise an acceleration sensor or a gyroscopic sensor. Such sensor types allow for a detection of a movement of the electronic key.

The triggering event may comprise the reception of an inquiry signal from a vehicle.

The electronic key, therefore, does not need to perform detection of movements if the electronic key is not needed. In this way, power consumption of the electronic key may be reduced.

The electronic key may be further configured to process the inquiry signal and send a response signal to the vehicle, if the electronic key is detected to be moving.

That is, an authentication of the electronic key is performed if the electronic key has been detected to be moving.

Performing a plurality of first reference measurements may comprise performing at least ten first reference measurements, and performing a plurality of second reference measurements may comprise performing at least ten second reference measurements.

A number of ten or more measurements allows to further increase the accuracy of the determination.

Each first reference measurement may provide three measurement values, one for each of three measurement axes, and the electronic key may be further configured to determine for each axis a first average value over the plurality of first reference measurements. Each second reference measurement may provide three measurement values, one for each of three measurement axes, and the electronic key may be configured to determine for each axis a second average value over the plurality of second reference measurements. This allows to determine a movement for each axis separately.

The microcontroller may comprise at least three internal registers. The at least three internal registers may comprise a first register for reference data measurement settings, the reference data measurement settings comprising at least the number of reference measurements that are to be performed and the bandwidth at which the reference measurements are to be performed, a second register for motion detection settings, and a third register for no-motion detection settings.

The microcontroller may be further configured to change into a low power mode if the electronic key has been detected as not moving for a predetermined amount of time, and if no inquiry signals are received from the vehicle. This reduces the battery consumption of the electronic key.

A method for operating an electronic key for a vehicle is described. The electronic key comprises a motion sensor and a microcontroller. Upon occurrence of a triggering event, a first measurement is performed with the motion sensor resulting in a first measurement value. The first measurement value is then compared to a predefined threshold value. If the first measurement value is below the predefined threshold value, a plurality of first reference measurements is performed, resulting in a plurality of first measurement values. A first average value is determined over the plurality of first reference measurements and stored in an internal or external memory of the microcontroller. If the first measurement value equals or is above the predefined threshold value, a plurality of second reference measurements is performed, resulting in a plurality of second measurement values. A second average value is determined over the plurality of second reference measurements and compared with the first average value. The electronic key is considered as moving if a difference between the second average value and the first average value is greater than a second threshold.

FIG. 1 illustrates an exemplary vehicle 10 with an exemplary keyless start and entry system. The start and entry system comprises a control unit 20. The control unit 20 may be arranged anywhere within or on the vehicle 10. The control unit 20 is configured to trigger an unlocking or engine start process if an electronic key belonging to the vehicle 10 is detected near or inside the vehicle 10. The control unit 20 sends out inquiry signals. Such inquiry signals are often low frequency (about 20 kHz to 200 kHz) signals. The inquiry signals are coded with a first coding chart. The inquiry signals may be received by a transponder unit 30 if the transponder unit 30 is within the range of the signals. The transponder unit 30 decodes, analyses and/or further processes the inquiry signals. After further processing the inquiry signals, the transponder unit 30 sends response signals back to the control unit 20. The response signals are coded with a second coding chart. The response signals may be generated by means of load modulation, for example, and may be decoded within the vehicle 10.

The vehicle 10 knows both coding charts and compares the original inquiry signals with the received response signals. If the response signals are identified as being correct, the vehicle 10 may be unlocked. If a start button is pressed and the response signals are identified as being correct, the vehicle 10 may be started. If, after sending the inquiry signals, no response signals or incorrect response signals are received within a predetermined time, nothing happens and the vehicle 10 remains locked and/or turned off.

The transponder unit 30 may be arranged within a vehicle key or a portable device such as a mobile phone, for example, which the user of the vehicle 10 carries with him and which is configured to replace the vehicle key and perform the typical actions of a vehicle key. The control unit 20 may send out inquiry signals in regular intervals or in response to a predetermined trigger event. Such a trigger event may be the user touching the door handle or pressing a start button, for example. The vehicle 10 may be any kind of vehicle, for example a passenger car, a truck, a bus, a train, a tractor, a motorcycle, a boat, or an aircraft.

To be able to more reliably protect the keyless start and entry system from so-called relay attacks, the vehicle 10 may only be unlocked when the transponder unit 30 is moving. In a relay attack, an unauthorized person places a first device in proximity of the vehicle 10 and the control unit 20, and a second device in proximity to the related transponder unit 30. In this way, messages that are sent between the vehicle 10 and the control unit 30 may be relayed over long distances that are significantly longer than the usual range of the signals. This allows the unauthorized person to unlock and even start the vehicle 10, even if the transponder unit 30 itself is not in proximity of the vehicle 10.

In many cases, relay attacks happen when the user is at home. That is, the user arrives at home and places his vehicle key at a key hook or on a shelf close to the front door, for example. For an unauthorized person it is then very easy to relay the messages sent from the vehicle 10 to the transponder unit 30 in the vehicle key, as the vehicle 10 is usually parked in close proximity in front of the house. In some cases, the vehicle key is even placed at a location within the house which is still within the usual range of the vehicle's inquiry signals. In such cases it might not even be necessary for an unauthorized person to relay the messages.

Figure 2:
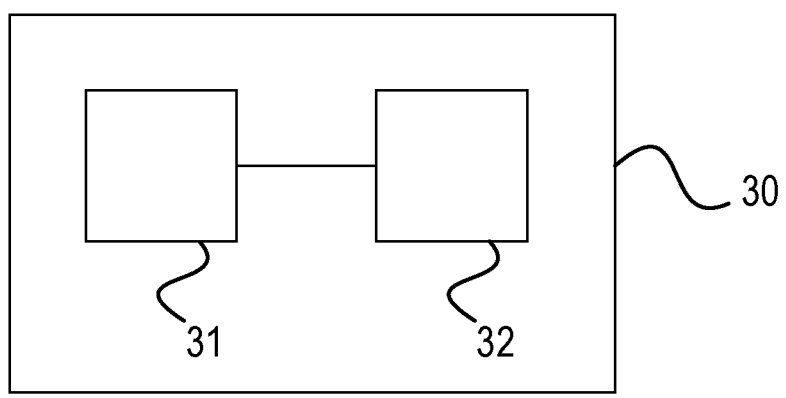
FIG. 2 schematically illustrates in a block diagram an exemplary electronic key according to the present disclosure.

Therefore, the transponder unit 30 comprises a motion sensor 31, as is schematically illustrated in the block diagram of FIG. 2. When a user arrives at home or at work, for example, and sets aside the vehicle key with the transponder unit 30, the transponder unit 30 usually does not move for a predetermined amount of time (e.g., several hours). When a user picks up his vehicle key and then walks towards the vehicle 10 with the intention of using it, a movement of the vehicle key may be detected. Therefore, if no movement of the transponder unit 30 is detected, this may be seen as an indication that the user does not intent to unlock and use his vehicle. On the other hand, if movement of the transponder unit 30 is detected, this may be seen as an indication that the user intents to unlock and use the vehicle 10.

The motion sensor 31, therefore, is configured to detect whether the transponder unit 30 is moving or not. The motion sensor 31 may comprise an acceleration sensor and/or a gyroscopic sensor, for example. Different motion sensors are known in the art and will not be described in further detail herein. The transponder unit 30 may further comprise a microcontroller 32 coupled to the motion sensor 31.

When the transponder unit 30 receives an inquiry signal from a vehicle 10 or upon another triggering event, it may be detected whether the transponder unit 30 is presently moving or not, before further processing the inquiry signal and possibly sending out a response signal to the vehicle 10. For example, a motion of the transponder unit 30 may be detected by means of the motion sensor 31 and, when the detected motion is below a predefined threshold, the transponder unit 30 may be considered as not moving. If the detected motion is above the predefined threshold, the transponder unit 30 may be considered as moving.

The threshold may be stored in an internal or an external memory of the microcontroller 32, for example. The microcontroller 32 may receive the values detected by the motion sensor 31 and compare the values to the threshold. If the transponder unit 30 is detected as moving, the microcontroller 32 may further process the inquiry signals and cause the transponder unit 30 to send a response signal.

However, motion sensors 31 are usually able to detect even short vibrations or impacts. Short vibrations and impacts, however, may occur unintentionally, even if the user is presently not moving towards the vehicle. Therefore, the transponder unit 30 is configured to further distinguish between short vibrations and impacts and longer movements.

To further improve the process of determining whether the transponder unit 30 is moving or not, the microcontroller 32 may perform further measurements. If, for example, in a first measurement it is detected that the transponder unit 30 is not moving, the microcontroller 32 may subsequently cause the motion sensor 31 to perform a plurality of first reference measurements. According to one example, sixteen first reference measurements are performed. Any other number n of first reference measurements with n≥2, or n≥10, however, is also possible. Generally, motion sensors may perform the measurements at a predetermined bandwidth which is selectable by a user. The first reference measurements, according to one example, are performed at a bandwidth of 31.25 Hz. Each first reference measurement delivers one or more measurement values. For example, each first reference measurement may provide three measurement values, one for each of three measurement axes roll, pitch and yaw. The microcontroller 32 may then determine for each axis an average value over the plurality of first reference measurements. These first average values for each axis may then be stored in an internal or external memory of the microcontroller 32.

If in a second measurement it is detected that the transponder unit 30 is moving, because the second measurement results in measurement values exceeding the threshold, another plurality of second reference measurements may be performed. According to one example, sixteen second reference measurements are performed. Any other number m of second reference measurements with m≥2, or m≥10, however, is also possible. According to one example, the number m of second reference measurements when a movement of the transponder unit 30 is detected equals the number n of first reference measurements when no movement of the transponder unit 30 has been detected (n=m). The second reference measurements, according to one example, are performed at a bandwidth of 31.25 Hz. Each second reference measurement delivers one or more measurement values. For example, each second reference measurement may provide three measurement values, one for each of three measurement axes roll, pitch and yaw. The microcontroller 32 may then determine for each axis an average value over the plurality of second reference measurements. These second average values may be compared to the first average values that were stored before when no movement of the transponder unit 30 had been detected. If a difference between the first average values and the second average values is equal to or exceeds a predetermined threshold, the transponder unit 30 may be detected as moving and the second average values may then be stored in an internal or external memory of the microcontroller 32. The second average values may replace any previously stored second values in the memory.

If at a later point in time the transponder unit 30 in a further measurement is again detected as not moving, the plurality of first reference measurements may be performed again, first average values may be determined as has been described above, and the first average values may be compared to the second average values stored in the memory of the microcontroller 32. The newly determined first average values may be stored in the memory and may replace any first average values previously stored in the memory.

The microcontroller 32 may comprise at least three internal registers. The at least three registers may include a first register for reference data measurement settings. The reference data measurement settings may include the number of reference measurements that are to be performed and the bandwidth at which the reference measurements are to be performed, for example. Any other measurement settings may be stored in the first register. The at least three registers may further include a second register for motion detection settings, and a third register for no-motion detection settings, for example.

When a no-motion detection event occurs, the motion sensor 31 may be set into reference data measurement mode and reference data measurement settings may be loaded into the motion sensor 31. Once the first reference measurements have been completed, the no-motion detect settings may be loaded to the motion sensor 31. The no-motion settings are used as long as no motion is detected. When a motion detection event occurs, the motion sensor 31 may again be set into reference data measurement mode and the reference data measurement settings may be loaded to the motion sensor 31. Once the second reference measurements have been completed, the motion detect settings may be loaded to the motion sensor 31. The motion detect settings may be used as long as a motion is detected. The motion settings may be used to wake up the microcontroller 32 from a low power mode, for example.

The microcontroller 32 may change into a low power mode, for example, if the transponder unit 30 has been detected as not moving for a predetermined amount of time and if no inquiry signals are received from the vehicle 10. In this way, the energy consumption of the transponder unit 30 may be reduced at such times when the transponder unit 30 is not needed, e.g., at night. Upon a microcontroller wake up event from a sleep mode, the registers of the microcontroller 32 may be compared to the setting corresponding to a present detection mode (moving or non-moving). If any differences are detected, a power on reset of the microcontroller 32 may be performed to ensure that the microcontroller 32 starts operation in a known state. At power on reset of the microcontroller 32, the at least three registers may be initialized and the motion sensor 31 may be set to no motion detection mode, using the no motion detection signals.

In this way, each time the transponder unit 30 is detected to be moving or not moving, the initial measurement is verified by performing a plurality of additional reference measurements. This allows to more reliably detect whether the transponder unit 30 is indeed moving or not. In particular, very short movements or vibrations may be clearly distinguished from longer movements. Usually, when a user walks to his vehicle 10 with the intention of using it, the transponder unit 30 moves for a significantly longer time (e.g., several seconds and more) as compared to very short vibrations that may be caused by any unwanted impacts.

Figure 3:
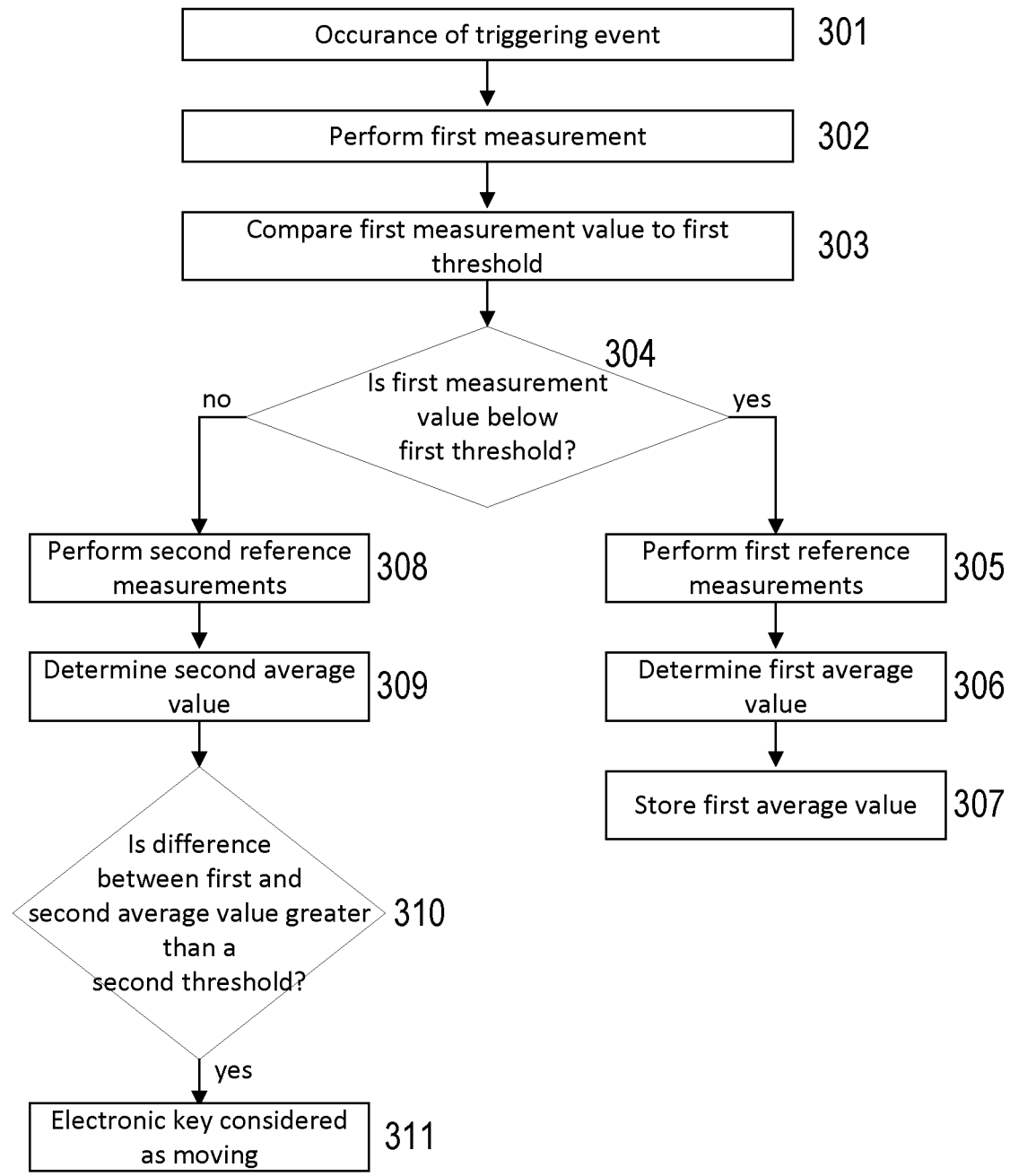
FIG. 3 illustrates in a flow diagram an exemplary method according to the present disclosure.

FIG. 3 exemplarily illustrates a method for operating an electronic key 30 for a vehicle according to one embodiment of the present disclosure. The electronic key 30 comprises a motion sensor 31 and a microcontroller 32. Upon occurrence of a triggering event (step 301), a first measurement is performed with the motion sensor 31 resulting in a first measurement value (step 302). The first measurement value is then compared to a predefined threshold value (step 303). If the first measurement value is below the predefined threshold value (step 304), a plurality of first reference measurements is performed, resulting in a plurality of first measurement values (step 305). A first average value is determined over the plurality of first reference measurements (step 306) and stored in an internal or external memory of the microcontroller (step 307). If the first measurement value equals or is above the predefined threshold value (step 304), a plurality of second reference measurements is performed, resulting in a plurality of second measurement values (step 308). A second average value is determined over the plurality of second reference measurements (step 309) and compared with the first average value (step 310). The electronic key 30 is considered as moving if a difference between the second average value and the first average value is greater than a second threshold (step 311).

The above described embodiments are merely illustrative of the principles of the present disclosure. It is understood that modifications and variations of the arrangements and the details described will be apparent to others skilled in the art. The intent is, therefore, to be limited only by the scope of the pending patent claims and not by the specific details presented by way of description and explanation of the discussed embodiments.

The invention claimed is:

1. An electronic key for a vehicle comprises
a motion sensor configured to detect a movement of a transponder unit; and
a microcontroller; wherein
the electronic key is configured to
upon occurrence of a triggering event, perform a first measurement with the motion sensor resulting in a first measurement value;
compare the first measurement value with a predefined first threshold value;
if the first measurement value is below the predefined first threshold value,
perform a plurality of first reference measurements, resulting in a plurality of first measurement values,
determine a first average value over the plurality of first reference measurements, and
store the first average value in a memory of the microcontroller; and
if the first measurement value equals or is above the predefined first threshold value,
perform a plurality of second reference measurements, resulting in a plurality of second measurement values,
determine a second average value over the plurality of second reference measurements, and
compare the second average value with the first average value, wherein the electronic key is considered as moving if a difference between the second average value and the first average value is greater than a third threshold.

2. The electronic key of claim 1 further configured to
after determining the first average value, compare the first average value with the second average value only if the second average value has already been stored in the memory of the microcontroller, wherein the electronic key is considered as not moving if a difference between the first average value and the second average value is greater than a second threshold.

3. The electronic key of claim 1 further configured to, after determining the second average value, storing the second average value in the memory of the microcontroller.

4. The electronic key of claim 1, wherein the motion sensor comprises an acceleration sensor or a gyroscopic sensor.

5. The electronic key of claim 1, wherein the triggering event comprises a reception of an inquiry signal from a vehicle.

6. The electronic key of claim 5, wherein the electronic key is further configured to process the inquiry signal and send a response signal to the vehicle if the electronic key is detected to be moving.

7. The electronic key of claim 1, wherein at least one of
performing a plurality of first reference measurements comprises performing at least ten first reference measurements, and
performing a plurality of second reference measurements comprises performing at least ten second reference measurements.

8. The electronic key of claim 1, wherein
each first reference measurement provides three measurement values, one for each of three measurement axes, wherein the electronic key is configured to determine for each axis the first average value over the plurality of first reference measurements; and
each second reference measurement provides three measurement values, one for each of three measurement axes, wherein the electronic key is configured to determine for each axis the second average value over the plurality of second reference measurements.

9. The electronic key of claim 1, wherein the microcontroller comprises at least three internal registers.

10. The electronic key of claim 9, wherein the at least three internal registers comprise
a first register for reference data measurement settings, the reference data measurement settings comprising at least a number of reference measurements that are to be performed and bandwidth at which the reference measurements are to be performed;
a second register for motion detection settings; and
a third register for no-motion detection settings.

11. The electronic key of claim 1, wherein the microcontroller is configured to switch into a low power mode if the electronic key has been detected as not moving for a predetermined amount of time, and if no inquiry signals are received from the vehicle.

12. A method for operating an electronic key for a vehicle, the electronic key comprising a motion sensor and a microcontroller, comprises
upon occurrence of a triggering event, performing a first measurement with the motion sensor resulting in a first measurement value;
comparing the first measurement value with a predefined first threshold value;
if the first measurement value is below the predefined first threshold value,
perform a plurality of first reference measurements, resulting in a plurality of first measurement values,
determine a first average value over the plurality of first reference measurements, and
store the first average value in an internal or external memory of the microcontroller; and
if the first measurement value equals or is above the predefined first threshold value,
perform a plurality of second reference measurements, resulting in a plurality of second measurement values,
determine a second average value over the plurality of second reference measurements,
compare the second average value with the first average value, wherein the electronic key is considered as moving if a difference between the second average value and the first average value is greater than a third threshold.

\* \* \* \* \*